United States Patent [19]

Follette

[11] Patent Number: 4,944,973
[45] Date of Patent: Jul. 31, 1990

[54] WRAPAROUND ARTICLE

[75] Inventor: Martha G. Follette, Menlo Park, Calif.

[73] Assignee: Raychem Corporation, Menlo Park, Calif.

[21] Appl. No.: 406,883

[22] Filed: Sep. 13, 1989

Related U.S. Application Data

[60] Continuation of Ser. No. 58,609, Jun. 4, 1987, abandoned, which is a continuation of Ser. No. 832,279, Apr. 7, 1986, abandoned, which is a division of Ser. No. 560,344, Dec. 12, 1983, Pat. No. 4,581,265.

[51] Int. Cl.$^5$ .................. H02G 15/00; B32B 31/00
[52] U.S. Cl. .................................. 428/36.1; 428/377
[58] Field of Search ........................... 428/36.1, 377

[56] References Cited

U.S. PATENT DOCUMENTS

| | | | |
|---|---|---|---|
| 2,960,561 | 11/1960 | Plummer | 174/36 |
| 3,038,205 | 6/1962 | Plummer | 18/47.5 |
| 3,858,282 | 1/1975 | Plummer | 24/201 C |
| 4,095,044 | 6/1978 | Horsma et al. | 174/138 F |
| 4,287,012 | 9/1981 | Midgley et al. | 156/86 |
| 4,378,393 | 3/1983 | Smuckler | 428/99 |
| 4,390,745 | 6/1983 | Böttcher et al. | 174/73 R |
| 4,409,426 | 10/1983 | Nolf | 428/36 |
| 4,436,566 | 3/1984 | Tight, Jr. | 156/56 |
| 4,466,843 | 8/1984 | Shimirak | 156/48 |
| 4,504,699 | 3/1985 | Dones et al. | 174/84 R |
| 4,536,445 | 8/1985 | Toy | 428/349 |
| 4,581,265 | 4/1986 | Follette | 428/36 |
| 4,610,921 | 9/1986 | Follette | 428/304.4 |

FOREIGN PATENT DOCUMENTS 2043729 10/1980 United Kingdom .

Primary Examiner—Christopher Henderson
Attorney, Agent, or Firm—A. Stephen Zavell; Herbert G. Burkard

[57] ABSTRACT

A wraparound closure with closure means which can be easily re-opened, such as a zipper or Velcro-type closure, provides environmental protection for splices or branch-offs in elongate substrates, such as communications or other cables, which closure has the advantage that it can be opened and re-closed easily and quickly. The end portions of the closure are sealed around the cable substrat with a sealing material having a cone penetration value of 100 to 350 ($10^{-1}$ mm) and an ultimate elongation of at least 200%. The wraparound may include a retaining means, such as a resilient plastic ring, which may be positioned to hold the wraparound closure away from the cable substrate when the closure is opened and work is being performed on the cable and may be positioned around the cable to provide support for the wraparound closure when it is in the closed position. The sealing material is attached to the inside of the end portions of the wraparound with a neoprene rubber adhesive to assure that the sealing material adheres to the wraparound and releases from the cable when the wraparound is removed from the cable substrate. The sealing material is also pre-formed into an appropriate shape for sealing between cables in a branch-off configuration.

8 Claims, 3 Drawing Sheets

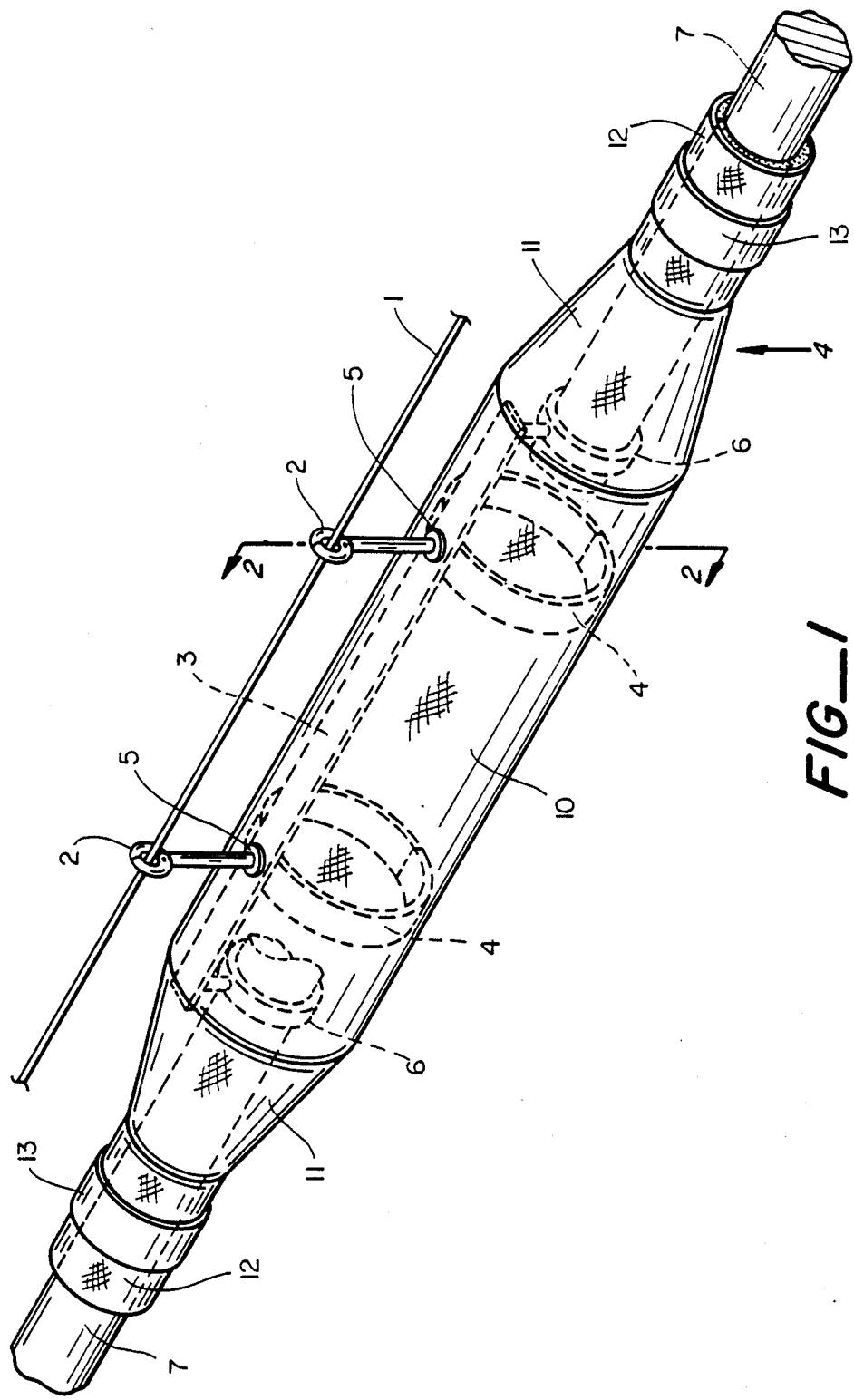

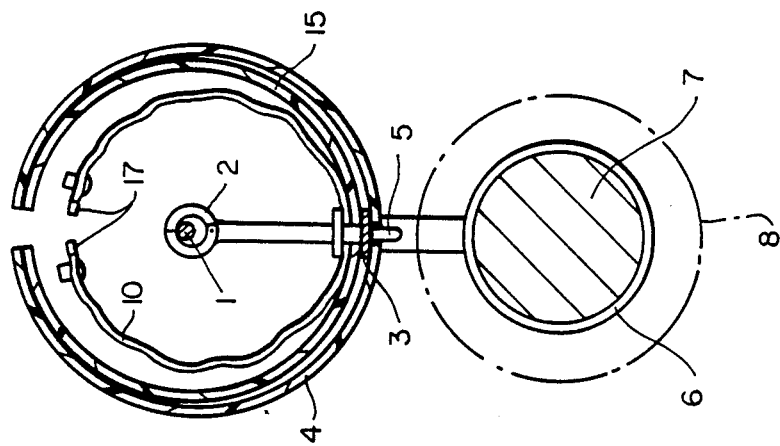
FIG_3
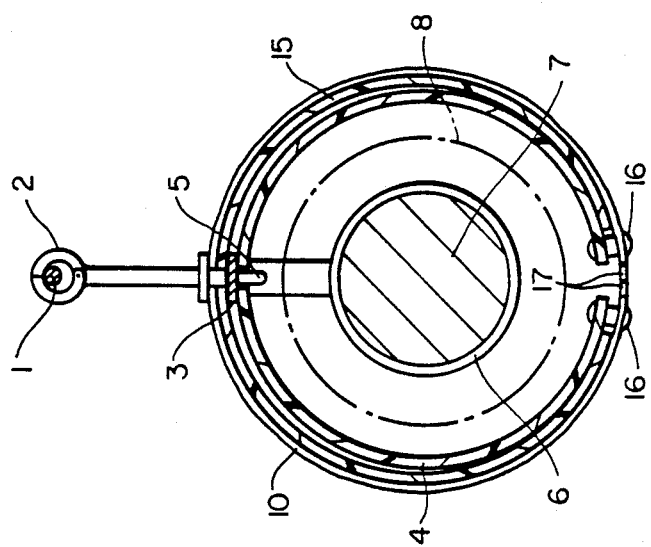
FIG_2

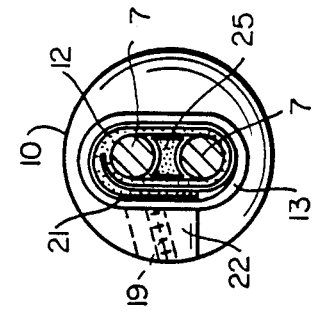
FIG_6
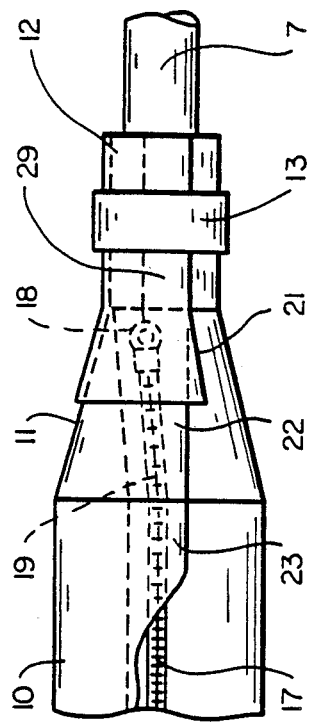
FIG_4
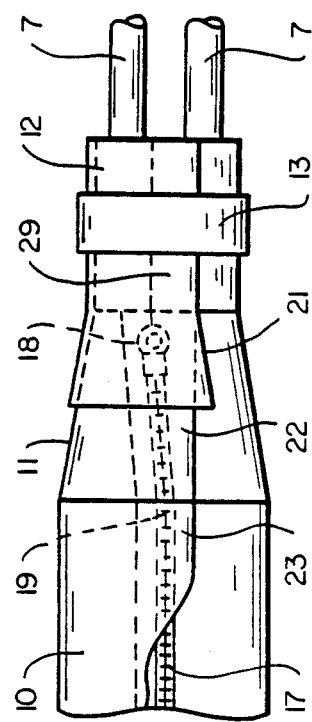
FIG_5

WRAPAROUND ARTICLE

This application is a continuation of application Ser. No. 07/058,609, filed Jun. 4, 1987, now abandoned which is a continuation of Ser. No. 06/832,279 filed Apr. 7, 1986, now abandoned, which is a division of Ser. No. 06/560,344 filed Dec. 12, 1983, now U.S. Pat. No. 4,581,265. It is related to Ser. No. 06/767,935 filed Sept. 6, 1986, now U.S. Pat. No. 4,610,921, which is also a divisional of Ser. No. 06/560,344 filed Dec. 12, 1983, now U.S. Pat. No. 4,581,265.

FIELD OF THE INVENTION

This invention relates to wraparound closures to provide environmental protection for elongate substrates, such as cable splices and branch-offs, particularly telecommunication cables.

BACKGROUND OF THE INVENTION

Wraparound closures are well-known in the art as illustrated by U.S. Pat. Nos. 3,379,218, 3,455,336, 3,350,898, 3,770,556 and 4,366,201. The formation of branch-off configurations are also known, as illustrated by U.S. Pat. No. 4,298,415. In general, wraparound closures have been made of heat-recoverable material and the environmental protection of the substrate is generally provided by recovering the wraparound tightly around the substrate and providing an environmental seal with the substrate by use of various sealants and adhesives, such as hot melt adhesives. The above closures generally provide very good environmental protection for the substrate but are now conveniently opened or re-entered for access to the substrate. Re-entry into such closures has usually been by destruction of the closure or a portion thereof which makes it impractical to re-close the closure. In general, a new closure must be applied to the substrate after re-entry. Other conventional closures are tubular types, which cannot be re-used after removal, and mechanical types, which are bolted together and are re-usable but are time-consuming in disassembly and re-assembly.

DESCRIPTION OF THE INVENTION

The objects of this invention include providing a wraparound closure for elongate substrates, such as telecommunication cables, electrical cables and the like, to provide sufficient environmental protection for the substrate and be easily re-entered and re-used. In many applications of wraparound closures it is not necessary to provide a complete moisture-proof closure but it is sufficient to keep water such as rain, snow, etc. out of the closure and off the splice or branch-off portion of the substrate.

The above objectives as well as others are satisfied by this invention, which, in one aspect, provides a flexible wraparound closure for enclosing an elongate substrate, which closure comprises a flexible water-resistant sheet adapted for enclosing a substrate by bringing opposing edges of the sheet together; closure means on the opposing edges of the sheet adapted for holding the opposing edges together and adapted for re-use by releasing the opposing edges from each other without destruction or damage to the closure means or the sheet; and sealing means on the inside surface of the end portions of the sheet for providing an environmental seal between the sheet and the substrate wherein the sealing means is a material having a cone penetration value of 100 to 350 ($10^{-1}$ mm) and in an ultimate elongation of at least 200%. In this aspect of the invention, the flexible water-resistant sheet which forms the wraparound closure can be made of a fabric, plastic, fabric-reinforced plastic or other material which has sufficient water-resistance, strength, and other properties such as temperature-resistance, UV light resistance, and other necessary properties for the environment in which UV light resistance, and other necessary properties for the environment in which the closure will be used. The closure means on the opposing edges of a sheet may be any convenient re-usable closure means which can be opened and closed a number of times, such as zippers, "Velcro" type fasteners, and the like, provided they have sufficient strength to hold the edges of the wraparound closure together under the conditions in which the closure will be used.

The sealing means is a material having a cone penetration value of 100 to 350 ($10^{-1}$ mm) and an ultimate .longatin of at least 200%. This material gives the environmental seal necessary between the wraparound closure sheet and the substrate on which it is used, is removable from the substrate when the sheet is removed and is re-usable to re-seal and provide the environmental seal when the wraparound closure is re-closed around the substrate. The materials usable as sealing means in this invention are described in co-pending, commonly-assigned application U.S. Ser. No. 507,435 filed Jun. 23, 1983, now abandoned the disclosure of which application is incorporated herein by reference in its entirety. As discussed in that co-pending application, the gel materials which are useful as the sealing means in this invention may be prepared with varying cone penetration values and elongation values to provide the particular performance required in the particular environment in which the wraparound closure is to be used. It is further preferred in the present invention to use the sealing means material in a flexible matrix, such as an open-cell foam also as disclosed in the above application. In this form the material is more convenient to handle and apply to the sheet as the sealing means. It is also convenient to provide a release paper or similar material on the sealing means, which protects the sealing means from contamination and prevents the sealing means from adhering to other surfaces before the wraparound closure is ready for installation on the cable substrate. The release paper is then removed when the wraparound closure is installed on the cable.

In a preferred aspect of this invention it is advantageous to have the end portions of the sheet which have the sealing means on the surface thereof of sufficient length and configuration to enable the sealing means to wrap the entire circumference of the cable substrate and overlap the end portion of the sheet sufficient to provide the desired environmental seal. It is also desirable to have a compresion means, such as a band or clamp, placed around the end portions of the wraparound sheet over the areas where the sealing means contacts the cable substrate in order to maintain sufficient compression force to maintain the desired environmental seal. The compression means may be removable and re-usable or may be disposable and replaced with new compression means when the wraparound disclosure of this invention is opened and re-closed.

An additional preferred feature of the present invention is that the sealing means also preferably overlaps a portion of the closure means near the end of the wraparound closure in order to enhance the environmental seal. For example, when a zipper is used the sealing means should overlap the ends of the zipper. An additional preferred embodiment for enhancing the environmental seal at the end of the closure means is to angle the line along which the closure means is attached to the sheet so that near the end portions of the wraparound closure. The closure means is attached to the sheet the closure means is attached to the sheet at a gradually increasing distance from the edge of the sheet thereby leaving an exterior flap on the sheet which can then overlap the closure means. It is preferred that this flap then have the sealing means material on the inside surface thereof such that it will overlap and contact the closure means and a portion of the opposing edge and outside sheet surface. The edge of the flap also conveniently forms a drip line for shedding rain when the closure means is placed at the bottom of the closure. The most preferred arrangement for the environmental seal is for the end portion sealing means to overlap this flap covering the end of the closure means. In some uses it may be desirable to have the sealing means cover the entire length of the closure means, for example, a flap may be extended from one edge of the sheet to cover the entire length of the closure means and the sealing means would be placed on the inside surface of the flap to seal the closure means.

In another aspect of the present invention, a reenterable, re-usable wraparound closure comprises a flexible water-resistant sheet adapted for enclosing a substrate by bringing opposing edges of the sheet together with the sheet disposed around the substrate; an elongate frame inside the sheet attached to the sheet at least at one point and being substantially parallel to the elongate substrate; retaining means hinged to the frame and adapted for positioning in one position to hold the sheet away from the substrate and for positioning in a second position to provide support for the sheet when the sheet is enclosed around the substrate; connector means attached to the frame and adapted to engage the substrate; and closure means on the opposing edges on the sheet adapted for holding the opposing edges of the sheet together.

In this aspect of the invention the connector means may be a connector which makes electrical contact with the cable, e.g., the shield and/or may be a clamp to engage the cable substrate to hold the frame and wraparound closure in a fixed position with respect to the cable substrate. While work is being performed on the cable, the retaining means may be positioned in the position to hold the sheet away from the substrate, usually in the upward direction. After the work is completed and the cable is ready to be enclosed by the wraparound, the retaining means is then positioned out of way or over or around the cable, usually in the downward position, and usually to provide a support or framework for the sheet when the sheet is enclosed around the substrate. The retaining means may be of any suitable structure capable of holding the sheet away from the substrate during work on the substrate and capable of being positioned such that the sheet can be enclosed around the substrate and preferably positioned such that it provides a support or frame for the sheet when it is enclosed around the substrate. A preferred material for the retaining means is a resilient plastic ring, such as PVC, which is hinged to the frame on one side and is split on the other side to allow it to be changed from one position to the other.

In an additional embodiment of this aspect of the invention, there may be means attached to the frame and extending through the sheet to holders which may be attached to a support strand usually above the cable. This embodiment is useful in those installations where the cable is supported by a support strand or cable. In this embodiment the holders attached to the support strand will support the entire wraparound closure and the cable which may be engaged in the clamping means. The retaining means for holding the sheet away from the substrate will function in the same way as without the holders attached to a support strand.

In an additional aspect of this invention, a problem was encountered relative to achieving the desired feature of having the sealing means preferentially adhere to the surface of the sheet so that when the sheet is removed from the substrate, the sealing means will separate cleanly from the substrate and remain on the surface of the sheet. It has been found that a material having a cone penetration value of 100 to 350 ($10^{-1}$ mm) and an ultimate elongation of at least 200% can be bonded to a surface by use of a a neoprene rubber adhesive, such as a contact cement containing neoprene rubber in aliphatic and aromatic hydrocarbon solvents, meeting military specification MIL-A-21366A. Such a contact cement is applied to both surfaces, allowed to air dry, then pressed together to form the bond. This combination of such a material bonded to a surface with the contact cement was found particularly useful when the material was impregnated in a porous matrix such as an open-cell foam, as described in the example in Ser. No. 507,435. To achieve the combination of such a material on a surface, the neoprene rubber adhesive is applied to the surface or to the material, then the material placed in contact with the surface to form the bond between the material and the surface.

Another aspect of this invention relates to an article for providing a seal between two substrates such as cables which are entering or exiting the wraparound closure. In this regard it has been found that an article comprising a shape made of material having a cone penetration value of 100 to 350 ($10^{-1}$ mm) and an ultimate elongation of at least 200% wherein the shape has at least two concave sides adapted for contacting the surface of at least two elongate substrates will establish a satisfactory seal between the two substrates when enclosed with a wraparound closure of this invention or other suitable closure. This article is particularly compatible with the wraparound closure of this application because this article will conform to substrates of different sizes and is easily deformed to establish a full seal when placed between two substrates which are then enclosed by the wraparound closure of this invention. In addition, this article can easily be removed and re-used when the wraparound closure of this application is opened and reclosed. It is preferred that the material from which the article is formed be impregnated in a porous matrix such as an open-cell foam, as disclosed in the above referenced co-pending application U.S. Ser. No. 507,435.

In a further aspect of this invention, it will be useful in many applications to use a liner inside the wraparound closure. Various liners are conventionally known and used in the art and may be used in the wraparound closure of this invention provided that the liner does not interfere with the essential features and functions of the closure of this invention. Liners may be selected to provide additional structural strength and support for the wraparound closure or for additional protection of the substrate or for other desired properties. Examples of the various liners known in the art are those shown in U.S. Pat. Nos. 4,142,592 and 4,380,686.

BRIEF DESCRIPTION OF THE DRAWINGS

FIG. 1 is a perspective view showing the wraparound closure of this invention.

FIG. 2 is a section view of the wraparound in the closed position.

FIG. 3 is a section view of the wraparound shown in the open position.

FIG. 4 is a bottom view of the end portion of the wraparound in FIG. 1.

FIG. 5 is a bottom view of the wraparound having two cables in the end portion thereof.

FIG. 6 is an end view of FIG. 5 showing the branch-off seal between the cables.

DESCRIPTION OF PREFERRED EMBODIMENTS

The wraparound closure of this invention is shown in perspective in FIG. 1. Sheet 10 is a vinyl-laminated polyester fabric identified as "Durapro Style No. 6059, Pattern No. 61" from Duracote Corporation and has tapered portions 11 connected to end portions 12 of the sheet. The sealing means is substantially the same as in the Example of Ser. No. 507,435 and a strip of that material bonded to the inside of the sheet at portion 12 of the sheet and contacts the cable 7. The sealing means is bonded to the inside surface of end portions 12 of sheet 10 with a neoprene rubber adhesive identified as "Royalbond Grip Waterproof Contact Cement" from Andal Aluminum Products Company. The contact cement was applied to the inside surface of sheet 10 and to the strip of sealing means material; both allowed to air dry at room temperature for about 2 hours; then pressed together to effect the bonding.

Inside sheet 10 is frame 3 which supports connector means 6 for engaging the cable. Retaining rings 4 are connected by hinge 5 to frame 3. Frame 3 is also connected to hanger means 2 which are connected to support strand 1. The closure means is on the bottom of the wraparound closure shown in FIG. 1 and is shown in bottom view FIG. 4. The closure means in this preferred embodiment is a Delrin tooth, double separating zipper type VFO-56 from YKK, Incorporated and is shown in FIG. 4 as zipper 17. Portion 19 of zipper 17 is placed at an angle on tapered section 11, which places the zipper at a progressively greater distance from the edge of sheet 10 to provide flap 22 for a wider coverage of the closure means. End portion 12, which has a sealing means on the inside surface thereof, is wrapped around cable 7 so that it overlaps itself as shown by overlap 29. The end portion also contains flap 21 also having sealing means on the inside surface thereof to overlap the end of the closure means 17 as well as a portion of flap 22. This arrangement gives the most preferred environmental seal. If desired, an optional flap 23 with sealing means on the inside surface thereof may be used to cover the entire length of closure means 17. Zipper slider 18 in FIG. 4 is used to close the zipper. Compression means 13 in FIGS. 1 and 4 is used to apply sufficient compressive force to end sections 12 to assure good environmental seal between the sealing means and cable 7.

FIG. 2 is a section view of the wraparound closure of FIG. 1 in which all the elements are the same as FIG. 1 except the additional elements of an optional liner 15 which may be used. It is preferred to attach the retaining ring 4 to sheet 10 snap fastener 16. Retaining ring 4 in this preferred example is a split section of 4-inch PVC pipe, ¾-inch wide. Connector means 6 is shown engaged with cable 7 while the splice bundle is shown by element 8.

FIG. 3 shows the same section as FIG. 2 with all the same elements but shows the retaining means 4 holding liner 15 and sheet 10 in the upper position away from substrate 7. In this position, substrate 7 and splice bundle 8 are fully exposed for work to be performed thereon, after which retaining means 4 is rotated to the lower position and the wraparound closure is re-closed to again protect the substrate, as shown in FIG. 2.

FIG. 5 is the same bottom view as FIG. 4 but shows two cables in the wraparound closure. FIG. 6 is an end view of the closure as shown in FIG. 5 and illustrates the use of the branck-off seal 25 of this invention to form a seal between the two cables entering the wraparound closure.

I claim:

1. An article comprising:
    a shape of material, said shape having two spaced apart parallel sides joined together at the edges by respective concave sides, said material having a cone penetration value of 100 to 350 ($10^{-1}$ mm) and an ultimate elongation of at least 200%, wherein the two concave sides adapted for contacting the surface of two elongate substrates and establishing a seal between the substrates.

2. An article according to claim 1 wherein the material is impregnated in a porous matrix.

3. An article according to claim 2 wherein the porous matrix is an open-cell foam.

4. An article according to claim 1 further comprising a wraparound enclosure, said wrap-around enclosure adapted for enclosing two or more elongate substrates in conjunction with said shape of material.

5. An article for enclosing two or more elongate substrates comprising:
    a shape of material, said shape having at least one concave side for at least each elongate substrate to be sealed, said material having a cone penetration value of 100 to 350 ($10^{-1}$ mm) and an ultimate elongation of at least 200%, wherein a concave side is adapted to seal an elongate substrate associated therewith between said shape of material and said substrate.

6. An article according to claim 5 further comprising a wraparound enclosure, said wraparound enclosure adapted for enclosing two or more elongate substrates in conjunction with said shape of material.

7. The article according to claim 6 wherein said elongate substrates are cables.

8. A kit-of-parts for enclosing two to more elongate substrates comprising:
    a shape of material, said shape having at least one concave side for at least each elongate substrate to be sealed, said material having a cone penetration value of 100 to 350 ($10^{-1}$ mm) and an ultimater elongation of at least 200%, wherein a concave side is adapted to seal an elongate substrate associated therewith between said shape of material ans said substrate; and
    a wraparound enclosure adapted to seal around the exterior of said shape of material and said elongate substrates.

* * * * *